United States Patent
Hammes

(10) Patent No.: US 9,423,499 B2
(45) Date of Patent: Aug. 23, 2016

(54) LASER SCANNER AND METHOD FOR A SAFE DETECTION OF OBJECTS

(71) Applicant: SICK AG, Waldkirch (DE)

(72) Inventor: Markus Hammes, Waldkirch (DE)

(73) Assignee: SICK AG, Waldkirch (DE)

( * ) Notice: Subject to any disclaimer, the term of this patent is extended or adjusted under 35 U.S.C. 154(b) by 0 days.

(21) Appl. No.: 14/669,032

(22) Filed: Mar. 26, 2015

(65) Prior Publication Data

US 2015/0285912 A1 Oct. 8, 2015

(30) Foreign Application Priority Data

Apr. 4, 2014 (EP) .................................. 14163500

(51) Int. Cl.
| | | |
|---|---|---|
| *G06K 7/10* | (2006.01) | |
| *G01S 17/02* | (2006.01) | |
| *G01S 7/491* | (2006.01) | |
| *G01S 17/42* | (2006.01) | |
| *G01S 7/481* | (2006.01) | |
| *G01S 7/497* | (2006.01) | |

(52) U.S. Cl.
CPC ............. *G01S 17/026* (2013.01); *G01S 7/4817* (2013.01); *G01S 7/497* (2013.01); *G01S 7/4911* (2013.01); *G01S 17/42* (2013.01); *G01S 2007/4975* (2013.01)

(58) Field of Classification Search
USPC .................... 235/454, 462.38, 462.39, 462.4
See application file for complete search history.

(56) References Cited

U.S. PATENT DOCUMENTS

| | | | | |
|---|---|---|---|---|
| 6,616,044 B1* | 9/2003 | Gu | ..................... | G06K 7/10584 |
| | | | | 235/462.14 |
| 7,617,983 B1* | 11/2009 | Fabian | ................ | G06K 7/10851 |
| | | | | 235/454 |
| 2006/0060651 A1* | 3/2006 | McIntyre | ............. | H04B 10/112 |
| | | | | 235/454 |
| 2009/0095814 A1* | 4/2009 | Haggerty | ............. | G02B 26/127 |
| | | | | 359/200.7 |
| 2014/0319219 A1* | 10/2014 | Liu | .................... | G06K 7/10831 |
| | | | | 235/455 |

FOREIGN PATENT DOCUMENTS

| | | |
|---|---|---|
| DE | 4340756 A1 | 6/1994 |
| DE | 102012102395 B3 | 1/2013 |
| DE | 102012112987 B3 | 12/2013 |
| EP | 2469296 B1 | 10/2012 |
| EP | 2482094 B1 | 6/2013 |

OTHER PUBLICATIONS

Search Report issued in European Patent Application No. 14163500.3-1812 dated Oct. 6, 2014.

* cited by examiner

*Primary Examiner* — Ahshik Kim
(74) *Attorney, Agent, or Firm* — Nath, Goldberg & Meyer; Jerald L. Meyer

(57) ABSTRACT

A laser scanner (10) is provided which has a light transmitter (12) for transmitting a light signal (16) into a monitored zone (20), a light receiver (26) for generating a received signal from the light signal (22) remitted by objects in the monitored zone (20), a movable deflection unit (18) for the periodic deflection of the light signal (16, 22) to scan the monitored zone (20) in the course of the movement, and an evaluation unit (34) for detecting the objects with reference to the received signal and for testing the signal path from the transmission of the light signal (16) up to the detection of the objects. In this respect, the evaluation unit (34) is configured also to detect objects in angular positions of the deflection unit (18) in which the signal path is tested.

15 Claims, 3 Drawing Sheets

LASER SCANNER AND METHOD FOR A SAFE DETECTION OF OBJECTS

The invention relates to a laser scanner and to a method for a safe detection of objects.

BACKGROUND

Optoelectronic symptoms, and in particular laser scanners, are suitable for distance measurements which require a large horizontal angular range of the measurement system. In a laser scanner, a light beam generated by a laser periodically sweeps over a monitored zone with the help of a deflection unit. The light is remitted at objects in the monitored zone and is evaluated in the scanner. A conclusion is drawn on the angular location of the object from the angular position of the deflection unit and additionally on the distance of the object from the laser scanner from the time of flight of light while using the speed of light. Two general principles are known for determining the time of flight of light for conventional light scanners. In phase-based processes, the continuous transmitted light is modulated and the phase shift of the received light with respect to the transmitted light is evaluated. In pulse-based processes or pulse transit time processes, the transmitter works in single pulse operation at comparatively high pulse energies and the laser scanner measures object distances with reference to the time of flight between the transmission and reception of a single light pulse. In a pulse averaging process known from EP 2 469 296 B1, a plurality of individual pulses are transmitted for a measurement and the received pulses are statistically evaluated.

The location of an object in the monitored zone is detected in two-dimensional polar coordinates using the angular data and the distance data. The positions of objects can thus be determined or their contour can be determined. The third spatial coordinate can likewise be detected by a relative movement in the transverse direction, for example by a further degree of freedom of movement of the deflection unit in the laser scanner or in that the object is conveyed relative to the laser scanner. Three-dimensional contours can thus also be measured.

In addition to such measurement applications, laser scanners are also used in safety technology for monitoring a danger source, such as a dangerous machine. Such a safety laser scanner is known from DE 43 40 756 A1. In this process, a protected field is monitored which may not be entered by operators during the operation of the machine. If the laser scanner recognizes an unauthorized intrusion into the protected field, for instance a leg of an operator, it triggers an emergency stop of the machine. Other intrusions into the protected field, for example by static machine parts, can be taught as permitted in advance. Warning fields are frequently disposed in front of the protected fields where intrusions initially only result in a warning to prevent the intrusion into the protected field and thus the securing in good time and so increase the availability of the plant. Safety laser scanners usually work as pulse-based.

Safety laser scanners have to work particularly reliably and must therefore satisfy high safety demands, for example the EN13849 standard for safety of machinery and the machinery standard EN1496 for electrosensitive protective equipment (ESPE). To satisfy these safety standards, a series of measures have to be taken such as a safe electronic evaluation by redundant, diverse electronics, functional monitoring or special monitoring of the contamination of optical components, in particular of a front screen.

One of these measures which turn a laser scanner into a safety laser scanner is the use of an internal reference target system with whose aid the error-free function of the distance measurement and its unimpaired sensitivity are checked. FIG. 5 shows such a conventional safety laser scanner 100 with a reference target 102 in a schematic plan view. This reference target 102 is optically scanned in every revolution of the deflection unit and the signal echo is evaluated with respect to signal strength and distance value. The comparison of this measurement with a taught expected value allows the assessment of whether the detection capability of the safety laser scanner is limited. In addition, a current distance offset which is caused by temperature-dependent internal signal transit time fluctuations can be determined and corrected from this measurement.

This monitoring and correction function can only be perceived when the reference target signal is independent of external circumstances such as external light, contamination and background emissions. This delineation from environmental influences is achieved in the prior art in that a contiguous angular range 104 of the viewing range is used exclusively for the reference target measurement. The carrier at which the deflection unit with motor, rotating mirror and angular encoder is suspended is also located in the angular range 104. The reference target 102 is also fastened to the carrier.

The advantage of the conventional implementation is the possibility of a continuous system testing with the aid of the actual measurement system. The disadvantage of this design is the reduction of the usable viewing range because the carrier with the reference target 104 blocks the optical beam path to the outside. The viewing range 106 is thereby restricted to approximately 270°. Applications in which a larger viewing range 106 is to be monitored can therefore only be covered by at least two safety laser scanners. In this respect, the situation shown in FIG. 5 with a dead zone in the angular range 104 is even shown too optimistically. The more compact the construction of the safety laser scanner, the more difficult it becomes to realize such a narrow angular range 104 as a dead zone or to achieve only a reduction by only approximately 90° at all.

A laser scanner is known from EP 2 482 094 B1 in which the test target or reference target does not lie in the scan plane, with the scan beam being conducted from the scan plane to the test target with the aid of a deflection unit. In an embodiment, the inner surface of a curved front screen forms the deflection unit. The deflection unit, however, shadows the angular range of the test goal in exactly the same way as the above-described carrier. In the case of the embodiment in which the front screen forms the deflection unit, it is separately mirrored in this angular range. This arrangement thus does not solve the problem of the dead zone.

SUMMARY

It is therefore the object of the invention to provide a laser scanner having an improved testing of the signal path.

This object is satisfied by a laser scanner and by a method for the safe detection of objects.

The laser scanner comprising:
a light transmitter for transmitting a light signal into a monitored zone,
a light receiver for generating a received signal from the light signal remitted by objects in the monitored zone,
a movable deflection unit for the periodic deflection of the light signal to scan the monitored zone in the course of the movement, and an evaluation unit for detecting the objects with reference to the received signal and for testing the signal path from the transmission of the light signal up to the detection of the objects, wherein the evaluation unit is configured also to detect objects in angular positions of the deflection unit in which the signal path is tested.

A laser scanner has a movable deflection unit, that is for example, a rotating optics head with light transmitter and receiver or a rotary rotating mirror and periodically scans a scan plane in this manner. On an additional tilt of the deflection unit, the monitored zone becomes a three-dimensional spatial zone. The laser scanner tests the complete signal path where possible, including the evaluation, and thereby becomes a safe laser scanner with a test of its function. The invention now starts from the basic idea of also detecting objects in angular positions in which the signal path is tested. This is strictly separated with conventional safe laser scanners. There is the viewing range of approximately 270° and a dead zone in which the test takes place by means of a reference target, but the light signal does not leave the laser scanner and thus cannot detect any objects. In accordance with the invention, this dead zone does not exist. The test of the signal path thus does not require any restriction of the field of view.

The invention has the advantage that the conventional contradiction between the demand for a 360° viewing range and a reference signal required for technical safety aspects is resolved for monitoring the detection capability. An internal testing of the signal path is made possible without a reduction of the viewing range. Safe laser scanners can thus achieve a field of view of up to 360°.

The laser scanner preferably has a test light transmitter for generating a test light signal, wherein the test light transmitter is aligned such that the test light signal moves within the laser scanner directly or via a scattering object within the housing or via the deflection unit to the light receiver. The test light signal replaces the signal of the conventional reference target at the reception side. There is the freedom as an active signal source independent of the measurement system to design the test light signal as desired both in its time behavior and in its signal shape. The test signal remains internal, it does not leave the laser scanner and is therefore also not falsified by environmental influences.

The test light transmitter is preferably orientated such that the test light signal is additionally reflected internally at a front screen of the laser scanner. The test light path here therefore additionally moves via the front screen and then directly or again via the deflection unit into the light receiver. The test light triggers a front screen reflection which is then evaluated as the test light signal. The angle of incidence on the front screen is preferably shallow enough that a large part of the test light or the total test light is internally reflected by total reflection. It is also conceivable to mirror the front screen at the incidence location of the test light in that this incidence location has a vertical offset from the passage location of the light signal of the measurement by a corresponding tilt angle of the test light transmitter.

The evaluation unit is preferably configured to trigger a test light signal of the test light transmitter at a point in time in which the test light signal is detected in the received signal with a time offset from the light signal. There is thus no irritating superposition of the test light signal and measurement signal in the received signal. The measurement and the test are decoupled time-wise and both the test and the measurement are possible in the same measurement period at the same angular position of the deflection unit.

The point in time preferably corresponds to a temporal dead zone at the start or at the end of a measurement. The ensures in advance that no superposition with a relevant measured signal can take place. A first temporal dead zone results in the extreme near region at the start of each measurement period by electronic internal signal transit times or optical signal transit times which correspond to distances still within the laser scanner. A second temporal dead zone corresponds either to a dead time between two measurements or, if measurements follow one another directly, from a distance which is outside the measurement range or which is admittedly still in the measurement range, but no longer at a specified distance where protected fields can be configured.

The evaluation unit is preferably configured to dynamically adapt the point in time in the course of the movement of the deflection unit. For example, the test is relocated to a point in time in the received signal in which no object lies after a preceding measurement or for an adjacent angle. A change between the first near temporal dead zone and the second far temporal dead zone is also conceivable. The dynamic adaptation of the point in time can also serve to test the evaluation of the transit time measurement since a changed point in time has to result in precisely one expected change of the transit time in an error-free system.

The evaluation unit is preferably configured to vary the amplitude of the test light signal. Light and dark targets with high or low remission are for example, thereby simulated which have to be detected both safely and at the correct distance.

The laser scanner preferably has an A/D converter and a memory to digitize the received signal and to record it for a following evaluation. Interference signals and useful signals can be separated in the time-resolved digital signal, the received point in time and thus the time of flight of light can be determined and the test signal can be separated from the measured signal.

The evaluation unit is preferably configured to test whether the test light signal is received at an expected minimum amplitude and/or in an expected angular position of the deflection unit. Impairments in the optical system, that is, for example, in the deflection unit or reception optics due to effects such as condensation, corrosion or maladjustment, as well as in the amplification of the light receiver or of its downstream analog electronics are recognized via the amplitude. The test signal is moreover expected in specific angular positions at which a lack of coincidence is recognized between the encoder for the angular position determination and the actual angular position.

The laser scanner preferably has a test light receiver which is arranged such that a portion of the light signal is received therein directly or after reflection at a front screen of the laser scanner. The previously named tests relate to the reception path. The transmission path is now also tested with the test light receiver. For this purpose, in particular a front screen reflection of the light signal of the actual light transmitter is evaluated. A contamination of the front screen can thus simultaneously be tested. This would anyway be required for a safe laser scanner so that the light transmitter can be tested without additional apparatus effort via a dual function.

The laser scanner preferably has a base unit and a top unit carried by a front screen, with the deflection unit being held in the top unit. A carrier in the rear dead angular range of the deflection unit conventionally serves for the mechanical holding. This is no longer possible if a viewing range of up to 360° is to be achieved. The front screen instead therefore becomes a carrying element and the motor is held from above. The test light transmitter can also be accommodated in the top unit next to the motor. Alternatively to supporting the motor from above, thing holder elements can also be conducted from below. These holding elements could admittedly be detected by the scanning beam, lie within the laser scanner and thus necessarily outside the relevant protected fields, whereby they are reliably and simply masked. Only a certain energetic loss, but by no means an incorrect measurement, thereby results. It is naturally possible to turn the design around; the base unit is then at the top and the top unit becomes a base unit despite the in this case less apt name. The orientation of the laser scanner anyway depends on the assembly at the location of the application.

The laser scanner is preferably configured as a distance measurement device in that the evaluation unit is configured to determine the time of flight of light between the transmission and the reception of the light signal and to determine the distance of an object from this. Substantially more accurate object information can thus be acquired than by a mere determination of the presence of objects. An angle measurement unit is preferably provided for detecting the angular position of the deflection unit. Complete two-dimensional position coordinates are then available overall for detected objects. In the case of a spatially extended monitored zone, the respective tilt angle of the scanning unit is also detected so that overall three-dimensional spherical coordinates are obtained which likewise completely describe the object position within the monitored zone.

The evaluation unit is preferably configured to correct the time of flight of light with reference to a point in time at which the test light signal is received. This serves, for example, for the temperature-dependent correction of the time of flight of light. The path of the test light becomes an optical reference path of the measurement of the time of flight of light. If only the electrical transit times are to be corrected, an electrical test signal can alternatively be fed in.

The laser scanner is preferably configured as a safety light scanner and has a safety output, with the evaluation unit being configured to determine whether an object is located in a protected field within the monitored zone and thereupon to output a safety-directed shut-down signal via the safety output. A safety laser scanner is a safe laser scanner in the sense of a safety standard such as initially described and can therefore in particular be used for personal protection at danger sources.

The method in accordance with the invention can be further developed in a similar manner and shows similar advantages in so doing. Such advantageous features are described in an exemplary, but not exclusive manner in the subordinate claims dependent on the independent claims.

The invention will be explained in more detail in the following also with respect to further features and advantages by way of example with reference to embodiments and to the enclosed drawing. The Figures of the drawing show in:

DESCRIPTION OF THE EMBODIMENTS

Figure 1:
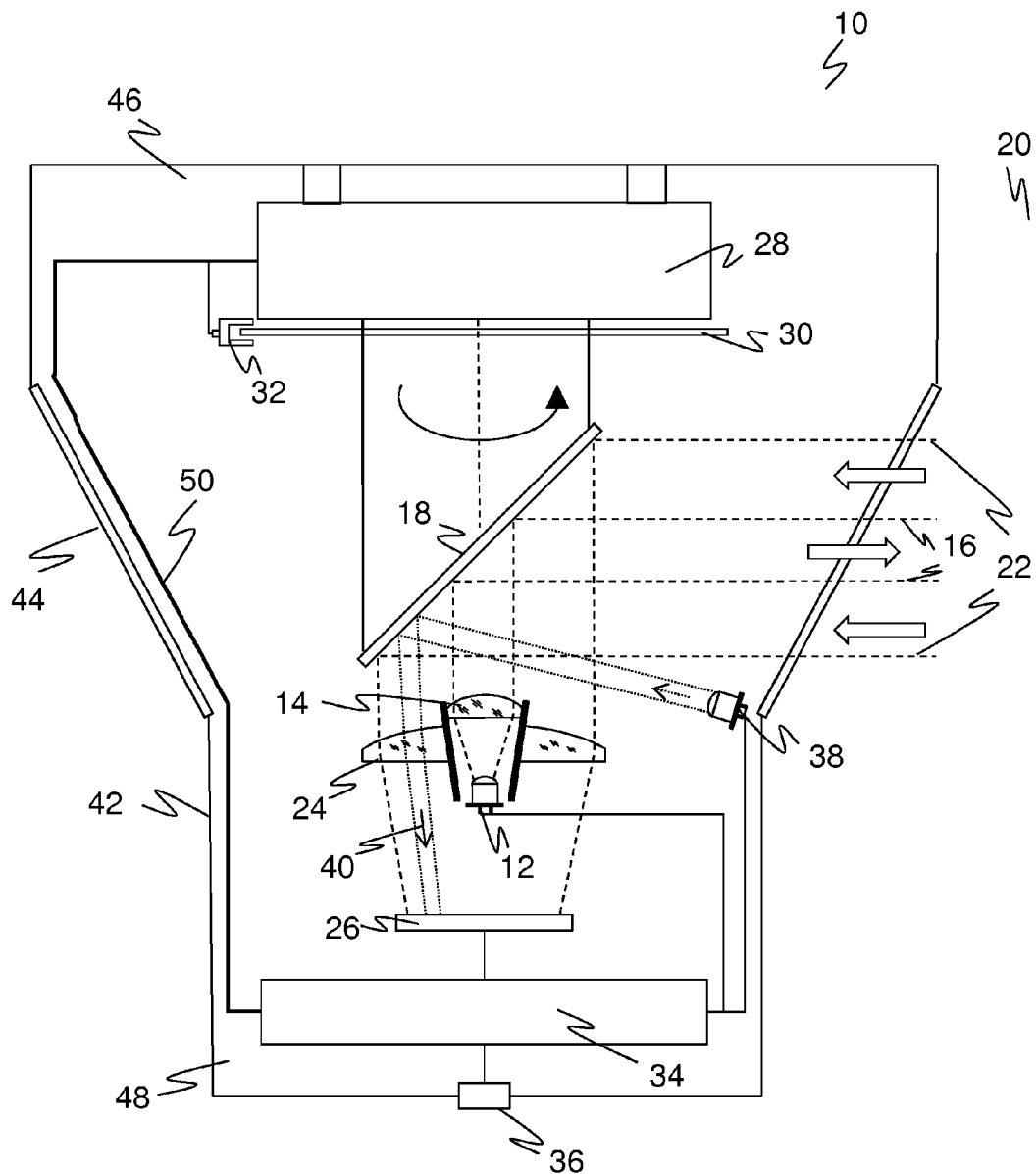
FIG. 1 a schematic sectional representation of an embodiment of a laser scanner.

FIG. 1 shows a schematic sectional representation through a laser scanner 10. A light transmitter 12, for example having a laser light source, generates, with the aid of a transmission optics 14, a transmitted light beam 16 which is deflected at a deflection unit 18 into a monitored zone 20. If the transmitted light beam 16 is incident on an object in the monitored zone 20, remitted light 22 again moves back to the laser scanner 10 and is there detected by a light receiver 26 via the deflection unit 18 and by means of a reception optics 24, for example a photodiode or an APC (avalanche photodiode).

The deflection unit 18 is configured in this embodiment as a rotating mirror which rotates continuously by the drive of a motor 28. The respective angular position of the motor 28 or of the deflection unit 28 is recognized via an encoder which, for example, includes a code disk 30 and a forked light barrier 32. The light beam 16 generated by the light transmitter 12 thus sweeps over the monitored zone 20 generated by the rotational movement. Instead of a rotating mirror, it is also possible to configure the deflection unit 18 as a rotating optics head in which the light transmitter 12 and/or the light receiver 26, and possibly further elements, are accommodated. The design of the transmission optics 14 and reception optics 24 can also be varied, for instance via a beam-shaping mirror as a deflection unit, another arrangement of the lenses or additional lenses.

If no remitted light 22 is received from the monitored zone 20 by the light receiver 26, a conclusion can be drawn on the angular position of the object in the monitored zone 20 from the angular position of the deflection unit 18 measured by the encoder 30, 32. In addition, the time of flight of light from the transmission of a light signal up to its reception after reflection at the object in the monitored zone 20 is determined and a conclusion is drawn on the distance of the object from the laser scanner 10 using the speed of light.

This evaluation takes place in an evaluation unit 34 which is connected for this purpose to the light transmitter 12, to the light receiver 26, to the motor 28 and to the encoder 32. Two-dimensional polar coordinates of all objects in the monitored zone 20 are thus available via the angle and the distance. In a technical safety application, the evaluation unit 34 checks whether a non-permitted object intrudes into a protected zone fixed within the monitored zone 20. If this is the case, a securing signal is output via a safety output 36 (OSSD, output signal switching device) to a monitored source of danger, for example to a machine. The laser scanner 10 is a safe laser scanner in such technical safety applications due to measures in accordance with the initially named standards.

One of these technical safety application measures is a test of the signal path using a test light signal. A test light transmitter 38 is provided for this purpose which can irradiate a test light signal 40 directly into the light receiver 26 or, as shown in FIG. 1, after reflection at the deflection unit 18.

All the named functional components are arranged in a housing 42 which has a front screen 44 in the region of the light exit and of the light entry.

The deflection unit 18 is set into rotational movement from above in the laser scanner 10. No carrier at the level of the light exit and of the light entry is required so that there is also no angular range of a dead zone in which the carrier or a reference target shadows the transmitted light beam 16 or the remitted light 22. The motor 28 is instead held by a top unit 46 of the housing 42. The front screen 44 thereby has a supporting function for the suspension of the deflection unit 18; it namely holds the top unit 46 with respect to a base unit 48 of the housing 42.

In this manner, the laser scanner 10 has a viewing range of up to 360°. Lines 50 for the power supply of the motor 28 and the transfer of the angular signal of the encoder 32 have to be conducted through the illumination zone of the transmitted light beam 16 with a 360° all-round view. A wireless transfer and supply is conceivable in principle, but very complex and/or expensive. As long as the lines 50 are conducted outside the mechanical rotational zone of the deflection unit 18 and are designed with a very small diameter and blacked, this is also not necessary. For then the lines 50 only bring about a certain energy reduction or slight energetic signal damping, but not a restriction of the viewing range. An incorrect measurement of the near zone echo as an object in a protected zone is precluded since the distance is too small and would still be measured within the laser scanner 10. Such near detections can be suppressed in a near zone suppression of the evaluation or optically by a near zone baffle.

It is also possible for similar considerations also to hold from below by holding elements instead of a suspension illustrated in FIG. 1 of the motor 28 and the deflection unit 18 at the top unit 46. Like the lines 50, which could in another respect be accommodated at or in the holding elements, the holding elements should be narrow and should be covered in black as well as optionally lie in the shadow of a near zone baffle. It is alternatively conceivable to use a hollow shaft motor, but the described embodiment variants are to be preferred for cost reasons.

Figure 2:
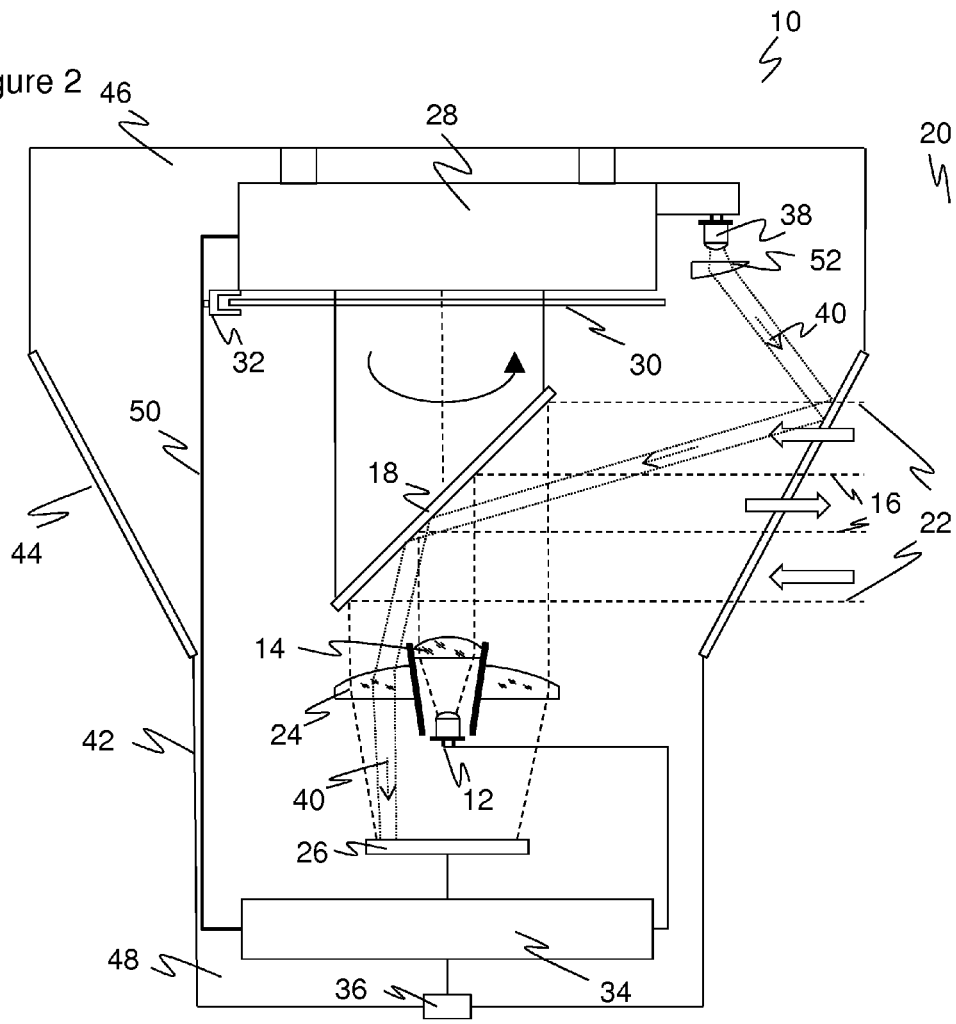
FIG. 2 a schematic sectional representation of a further embodiment of a laser scanner.

FIG. 2 shows a further embodiment of the laser scanner 10. In this respect, the same reference numerals designate the same features or mutually corresponding features in the total description. This embodiment above all differs from that in FIG. 1 by the attachment of the test light transmitter 38 next to the motor 28. The test light signal 40 is additionally reflected at the inner side of the front screen due to this arrangement on a test light path to the light receiver 26. So that the circuit board of the test light transmitter 38 does not have to be tilted for its orientation, a deflection prism 52 is positioned upstream which is at the same time collimating and thus replaces a collimation lens. In addition, the lines in the embodiment in accordance with FIG. 2 are attached directly from top to bottom and not at the front screen 44. Variation possibilities which can also be differently combined should be illustrated by the differences between FIGS. 1 and 2. A deflection prism 52 can thus also be used in the embodiment in accordance with FIG. 1, just as the lines 50 can selectively be conducted directly or at the front screen 44.

A large visual range of up to 360° can be realized using the laser scanner 10 in accordance with the invention without having to dispense with the reference target measurement for testing the signal path conventionally accommodated in an angular range of a dead zone. The test of the signal path for transmitting the transmitted light beam 16 up to the determination of a distance from a time of flight of light will now be explained in more detail with reference to FIGS. 3 and 4.

Figure 3:
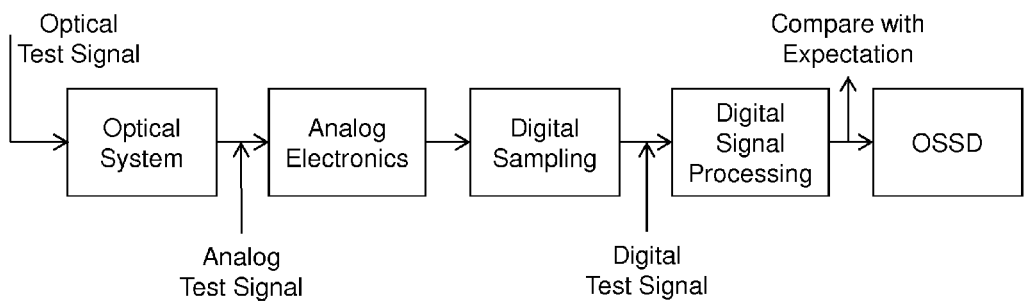
FIG. 3 a representation of the signal path to be tested in a laser scanner.

FIG. 3 shows a representation of the signal path to be tested in a laser scanner. This signal processing chain should be detected as completely as possible, ideally starting from the light transmitter 12 up to the digital measured result. The different aspects should be covered with as few tests as possible.

First, the optical system, that is in particular the light transmitter 12, transmission optics 14, deflection unit 18, reception optics 24 and light receiver 26, can be tested using an optical test or a signal reference signal. The remainder of the signal chain could also be tested with a fed-in analog test signal alternatively to the received signal generated from the optical test signal in the light receiver 26. The analog electronics are thus tested next, that is, for example, an amplifier or an analog signal filter. A digital sampling subsequently takes place. The required A/D converter is understood as part of the evaluation unit 34 in FIGS. 1 and 2 and is not shown separately there. After the digital scanning, the received signal is available as a time-resolved digital signal for a further evaluation.

Again, from there, the remainder of the signal chain could now be tested with a fed-in, now digital test signal alternatively to the digitized received signal of the optical reference signal. The digital signal processing determines, after an optional digital preprocessing, a point in time at which the test signal was received and from this a signal transit time or a time of flight of light. When observing the signal chain of FIG. 3, it becomes clear that the determined signal transit time includes an internal component of electrical transit times which has to be considered by calibration. These transit times are moreover temperature-dependent. A corresponding drift can be recognized from the transit time of the test signal and thus compensated. The optical system is not prone to such drifts because the time of flight of light is not temperature-dependent, so that an electronic test is sufficient here.

The evaluation unit 34 has an expectation as to when the optical reference signal should be received with an error-free function and can thus reveal errors. If the function is not ensured, a safety-directed shut-down via the safety output 36 (OSSD) is triggered.

The conventional reference target measurement in an angular range of a dead zone can satisfy the following six objects:

Object of the Reference Target
1. Monitoring of the amplification of the light receiver 12
2. Monitoring of the losses in the optical system
3. Vertical scan field variation (mechanical/thermal influences)
4. Rotation of the code disk 32 with respect to the system
5. Determination of the temperature-dependent offset of the distance measurement
6. Monitoring of the laser performance The same objects can also be satisfied by the laser scanner 10 in accordance with the invention which does not, however, have any dead zone. These alternatives are typically, but not necessarily, based on the signal of the test light transmitter 38. This relates to the objects 1-5 at the reception side; the testing of the laser performance at the transmission side takes place using an additional light receiver or by co-use of a light receiver which is anyway present for a contamination test of the front screen 44.

Alternatives in Laser Scanner 10:
1. Internal optical test signal
2. Internal optical test signal/Scattered light monitoring
3. Internal optical test signal/Varied front screen reflection (direct derivation makes good adjustment necessary)/ Cyclic tests of the protected field with a test bar
4. Internal optical test signal/Shape matching of the components/Centering pin/Adhesive bonding
5. Internal optical or electrical test signal
6. Additional reception diode/Co-use of the contamination measurement (measurement of the mean cw power of the inner front screen reflection)

Figure 4:
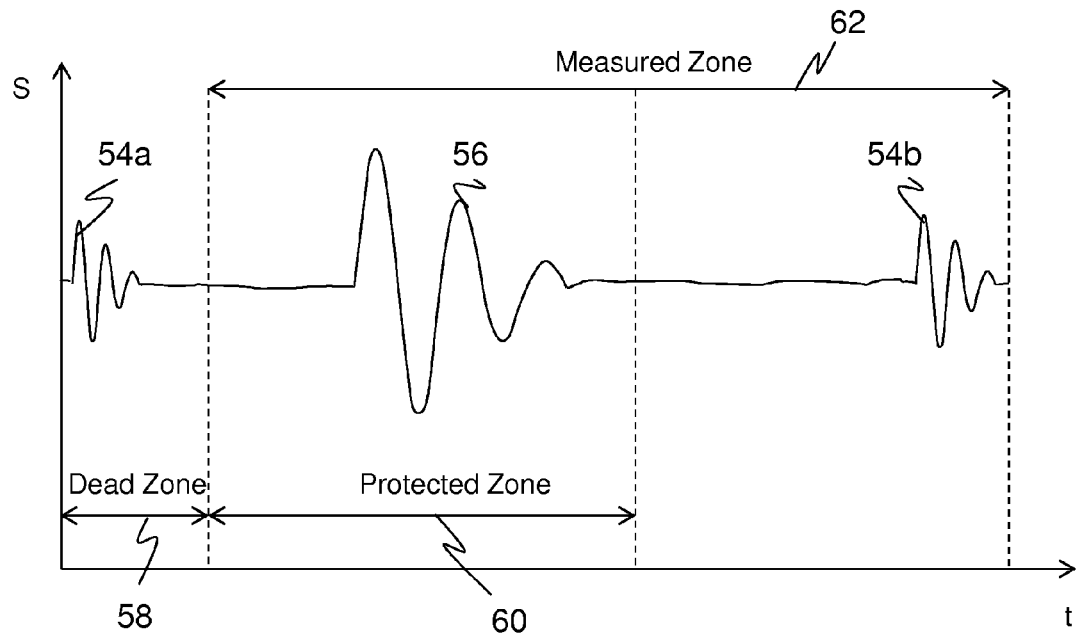
FIG. 4 an exemplary time-resolved received signal for explaining the temporal decoupling of the measured signal and the test signal, in particular with the aid of temporal dead zones.
Figure 5:
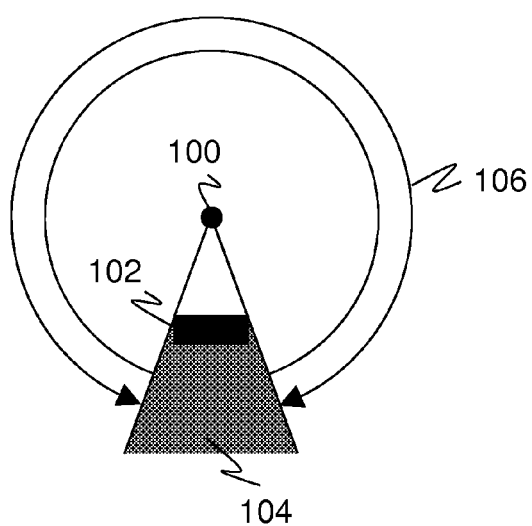
FIG. 5 a schematic plan view of the monitored zone of a conventional laser scanner with a dead zone over a contiguous angular range.

FIG. 4 shows an exemplary time-resolved received signal for explaining an advantageous temporal decoupling of the measured signal and test signal, in particular with the aid of temporal time zones. The test of the signal path is thereby no longer spatially separated by angular ranges, but rather temporally by the actual measurement. Time ranges are used for this purpose which are either not required at all for the measurement or which are at least not relevant from a technical safety aspect.

Two test signals 54*a-b* and one measured signal 56 can be recognized in the received signal in FIG. 4. One test signal 54*a-b* is sufficient for the real test; however, a plurality of possible time positions should be illustrated. There is here still a special feature that the signals 54*a-b*, 56 include a plurality of vibration cycles. This arises with a special measurement process such as explained in EP 2 482 094 B1 named in the introduction in which the reception pulse instigates a resonant circuit and its decaying is visible in the received signal. The duration of the decay then also has to be taken into account for the temporal decoupling. With a directly pulse-based time of flight of light process, the signals 56*a-b*, 56 would be correspondingly simpler and narrower. This underlines the fact overall that the invention is not fixed to a specific signal shape.

As long as the test signal 54*a-b* and the measured signal 56 are not superposed, separate evaluations can be carried out for the test and measurement on the same received signal. There are therefore no angular positions of the deflection unit 18 which would be used exclusively only for the test or only for the measurement, and there is therefore also no angular range of a dead zone.

The superposition of the test signal 54*a-b* and of the measured signal 56 can now be achieved reliably and simply in that either an anyway present temporal dead zone 58 is used directly after the transmission time, which results on the basis of internal signal transit times, or which corresponds to extremely short distances which remain within the laser scanner and cannot therefore collide with a measurement. Alternatively, a pause between two measurements can be used or, with a pause-free measurement, a temporal dead zone outside a protected zone 60. This dead zone is admittedly still within the measured zone 62, but is already temporally after the maximum protected field range which can be specified.

The required temporal independence of the test signal 54*a-b* from the measured signal 56 is given by the separate test light transmitter 38. The total received signal such as is shown by way of example in FIG. 4 or at least all the relevant information thereon is available to the evaluation unit 34 after the digital scanning.

Instead of the described temporal decoupling, other possibilities are also imaginable such as a spectral decoupling in which the light transmitter 12 and the test light transmitter 38 use different frequencies or signal encodings.

Although the test of the signal path thus no longer blocks an angular range, all of the above six objects of the conventional reference target measurement can be satisfied. In principle, different possibilities of optical and/or electronic measurements are available for this purpose, and in part also other measures. Variation possibilities result, for example, due to the optical arrangement such as illustrated with reference to FIGS. 1 and 2 and due to the temporal arrangement of the test signals. To achieve a temporal delineation from the measured signal and from environmental influences, the test signal is generated via the test light transmitter 38 and is thus independent of the measurement system in time behavior and signal shape.

The monitoring of the power of the light transmitter 12 (object 6) can no longer be taken over by the reference target system. This is unproblematic because in analogy to conventional contamination test systems of the front screen, the front screen reflection of the transmitted light beam 16 is guided on a further light receiver not shown in FIGS. 1 and 2 and can thus optionally be averaged in time on each passage and evaluated as to its intensity. The contamination test system can be utilized in a dual function for this purpose.

The remaining five objects 1-5 can be satisfied by an evaluation of the internal optical test signal of the test light transmitter 38. The test light transmitter 38 should be similar enough to the light transmitter 12 in a spectral and temporal aspect that a signal which can be evaluated is generated in the reception path. The test light transmitter 38 does not have to be particularly powerful since its light is irradiated directly, or at least with very short light paths, within the laser scanner 10. A simple laser diode, a relatively weak VSCEL or also an LED is sufficient for this purpose. The time behavior of the test light transmitter 38 is above all important in the already addressed method in accordance with EP 2 482 094 B1 so that the band pass properties of the analog electronics of the resonant circuit are excited accordingly.

The inclusion of the deflection unit 18 in the beam path of the test light transmitter 38 allows the checking of the adjustment of the system and at least a rough monitoring of the scan field planarity, with the latter also being at best roughly checked by the conventional reference target measurement.

The trigger time of the test light transmitter 38 now fixes the position of the test signal 54*a-b* in the signal window (cf. FIG. 4 again). With a short pulse length and a sufficient dead zone 58, this can be before the time range relevant to the protected zone. When a resonant circuit is used in the analog part, the extension of the test signal 54*a* has to be taken into account. This initial time position is preferred due to the generally precluded interaction with the measured signal 56. On the other hand, the test signal 54*b* can be placed behind the protected zone 60, that is in a time interval which exceeds the time of flight of the light up to the maximum protected field limit and back. If there is an echo or reverberation of a measured signal 56 here, it is again possible to switch to the front dead zone 58 since in this case there is obviously no measured signal 56 in the short distance.

An adaptive adaptation with which the test and the measurement avoid one another is an advantage of this process since it would not be possible with a rigid angular range of a dead zone and there is no comparable degree of freedom there. The amplitude of the test signal is an additional degree of freedom. Different reference target types such as light, dark or different in time can be realized by the adjustment parameters of the test light transmitter 38. Respective separate reference targets or reference target ranges were conventionally required for this purpose.

The invention claimed is:

1. A laser scanner comprising:
   a light transmitter for transmitting a light signal into a monitored zone,
   a light receiver for generating a received signal from the light signal remitted by objects in the monitored zone,
   a test light transmitter for generating a test light signal,
   a movable deflection unit for the periodic deflection of the light signal to scan the monitored zone in the course of the movement, and
   an evaluation unit for detecting the objects with reference to the received signal and for testing the signal path from the transmission of the light signal up to the detection of the objects,
   wherein the evaluation unit is configured also to detect objects in angular positions of the deflection unit in which the signal path is tested, and wherein the test light transmitter is orientated such that the test light signal within the laser scanner moves directly or via a scattering object within the housing or via the deflection unit to the light receiver.

2. The laser scanner in accordance with claim 1, wherein the test light transmitter is orientated such that the test light signal is additionally internally reflected at a front screen of the laser scanner.

3. The laser scanner in accordance with claim 1, wherein the evaluation unit is configured to trigger a test light signal of the test light transmitter at a point in time in which the test light signal is detected in the received signal at a time offset from the light signal.

4. The laser scanner in accordance with claim 3, wherein the point in time corresponds to a temporal dead zone at the start or at the end of a measurement.

5. The laser scanner in accordance with claim 3, wherein the evaluation unit is configured to adapt the point in time dynamically in the course of the movement of the deflection unit.

6. A method for the safe detection of objects in a monitored zone, the method comprising the steps of:
transmitting a light signal by a light transmitter into the monitored zone;
forming a received signal in a light receiver from the light signal remitted by objects in the monitored zone;
scanning the monitored zone by periodic deflection of the light signal at a movable deflection unit, with the objects being detected with reference to the received signal;
testing a signal path from the transmission of the light signal up to the detection of the objects;
detecting objects in angular positions of the deflection unit in which the signal path is tested;
determining a time of flight of light between the transmission and the reception of the light signal; and
determining the distance of an object from the time of flight.

7. The laser scanner in accordance with claim 1, wherein the evaluation unit is configured to vary the amplitude of the test light signal.

8. The laser scanner in accordance with claim 1, further comprising an A/D converter and a memory to digitize the received signal and to record it for a following evaluation.

9. The laser scanner in accordance with claim 1, wherein the evaluation unit is configured to test whether the test light signal is received at an expected minimum amplitude and/or in an expected angular position of the deflection unit.

10. The laser scanner in accordance with claim 1, further comprising a test light receiver which is arranged such that a portion of the light signal is received therein directly or after reflection at a front screen of the laser scanner.

11. The laser scanner in accordance with claim 1, wherein the laser scanner has a base unit and a top unit supported by a front screen; and wherein the deflection unit is held in the top unit.

12. The laser scanner in accordance with claim 1, further comprising an angle measurement unit for detecting the angular position of the deflection unit.

13. The laser scanner in accordance with claim 1, which is configured as a safety light scanner and has a safety output, with the evaluation unit being configured to determine whether an object is located in a protected field within the monitored zone and thereupon to output a safety-directed shut-down signal via the safety output.

14. The laser scanner in accordance with claim 6, wherein the evaluation unit is configured to correct the time of flight of light with reference to a point in time at which the test light signal is received.

15. A laser scanner comprising:
a light transmitter for transmitting a light signal into a monitored zone,
a light receiver for generating a received signal from the light signal remitted by objects in the monitored zone,
a movable deflection unit for the periodic deflection of the light signal to scan the monitored zone in the course of the movement, and
an evaluation unit for detecting the objects with reference to the received signal and for testing the signal path from the transmission of the light signal up to the detection of the objects,
wherein the laser scanner is configured as a distance measurement device and the evaluation unit is configured to determine a time of flight of light between the transmission and the reception of the light signal, to determine the distance of an object from it, and to detect objects in angular positions of the deflection unit in which the signal path is tested.

* * * * *